United States Patent [19]

Knox, Jr.

[11] 4,077,276

[45] Mar. 7, 1978

[54] ACTUATOR LEVER LOCK FOR A FOUR WHEEL DRIVE VEHICLE TRANSFER CASE

[76] Inventor: William G. Knox, Jr., 2079 N. Redding Ave., San Gabriel, Calif. 91770

[21] Appl. No.: 734,545

[22] Filed: Oct. 21, 1976

[51] Int. Cl.² .............................................. G05G 9/00
[52] U.S. Cl. ...................................... 74/475; 70/203; 180/82 A
[58] Field of Search ....................... 74/475; 180/82 A; 70/192, 202, 203

[56] References Cited

U.S. PATENT DOCUMENTS

| 1,170,310 | 2/1916 | Miles | 70/203 |
| 1,247,512 | 11/1917 | Dobler | 70/202 |
| 2,875,640 | 3/1959 | Huso | 180/82 A X |

Primary Examiner—Edgar W. Geoghegan
Attorney, Agent, or Firm—Boniard I. Brown

[57] ABSTRACT

A lock having at least one gate or U-shaped opening for releasably engaging the actuator lever for controlling a transfer case of a four wheel drive vehicle is disclosed. The lock is pivotally mounted on the transfer case so that it can be engaged and disengaged from the lever. In the preferable embodiment, lockable gate closure means are provided to retain the transfer case in a two wheel drive, high speed gear ratio position or neutral so that the drive train of the vehicle can be locked in its normal condition or in an inoperative condition.

10 Claims, 6 Drawing Figures

U.S. Patent      March 7, 1978      4,077,276
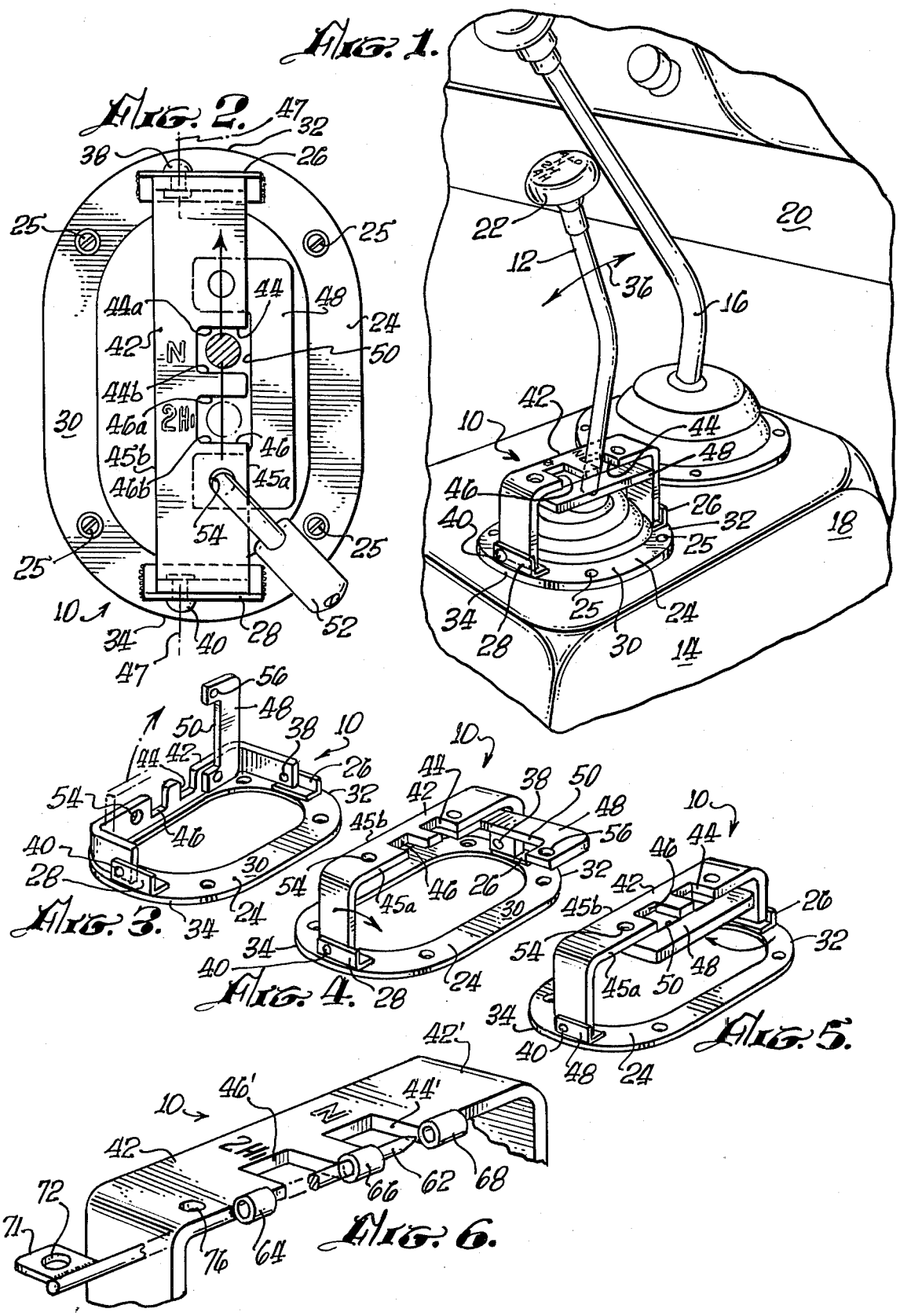

4,077,276

ACTUATOR LEVER LOCK FOR A FOUR WHEEL DRIVE VEHICLE TRANSFER CASE

BACKGROUND OF THE INVENTION

Many off-road vehicles have a drive train that provides driving torque to all four wheels of the vehicle. Usually such vehicles have a transfer case which is used to selectively shift the drive train into one of four modes which are: four wheel drive, low speed; neutral; two wheel drive, high speed; and four wheel drive, high speed. The high speed settings are normally used when the vehicle is being used on a highway or a high speed stretch of relatively smooth terrain whereas the low speed setting is used where greater than normal gear reduction is required, such as in mountain climbing. The drive train mode is usually controlled by an actuator lever which extends from the transfer case into the driver's compartment much like the conventional floor shift lever extends from a vehicle's primary transmission. It is unfortunate that in many vehicles, the actuator lever for the transfer case is in a position where it is easily struck by knees and legs especially if the vehicle and its occupants are bouncing around due to rough terrain.

There has been a need for means to retain the transfer case actuator lever in a desired position so that the transfer case remains in the desired mode of power transfer including means that also can lock the transfer case in the neutral position so that theft of the vehicle is more difficult. Generally similar devices for floor shifts and brakes are shown in U.S. Pat. Nos. 991,014, 1,131,720, 1,170,310, 1,247,512 and 1,406,150, however none show a lock for a transfer case actuator lever which can be as quickly and economically installed, easily constructed and yet is effective to provide the desired results.

BRIEF DESCRIPTION OF THE PRESENT INVENTION

The present actuator lever lock prevents accidental or intentional shifting of the actuator lever for the transfer case of a four wheel drive vehicle. The device is generally comprised of an inverted U-shaped strap bracket pivotally mounted at its ends to a member preferably permanently mounted to the transfer case. Sidewise gates or U-shaped openings are provided in the side of the bracket which, as it swings about its pivot axis, engage the transfer case actuator lever to retain it in a desired position. A movable closure member is provided to close the gates and surround the actuator lever therewithin. Means are usually provided on the movable member and the bracket so they can be locked about the lever by a padlock. Although in the present application, means are provided to lock the transfer case in a neutral mode or a two-wheel drive highway mode, sufficient gates can be included so that the transfer case can be locked in any desired configuration.

It is therefore a principle object of the present invention to provide means to prevent accidental or intentional shifting of the transfer case of a four wheel drive vehicle.

Another object is to prevent the theft of a four wheel drive vehicle by locking the drive train in an inoperative mode.

Another object is to provide economical and easily installed means to maintain the actuator lever of a four wheel drive transfer case in a desired position, thus retaining the transfer case in a desired drive mode.

These and other objects and advantages of the present invention will become apparent after considering the following detailed specification which discloses preferred embodiments thereof in conjunction with the accompanying drawing wherein:

BRIEF DESCRIPTION OF THE DRAWING

FIG. 1 is a perspective view of the present invention installed on the floor above the transfer case of a four wheel drive vehicle;

FIG. 2 is a top plan view of the device of FIG. 1 showing a padlock installed thereon;

FIGS. 3, 4 and 5 are isometric views of the lock of FIG. 2 showing the movement possibilities thereof; and FIG. 6 is a partial isometric view of a slightly modified embodiment of the lock shown in FIGS. 1 through 5.

DETAILED DESCRIPTION OF THE PRESENT EMBODIMENTS

Referring to the drawings more particularly by reference number, number 10 in FIG. 1 refers to the lock of the present invention for retaining the actuator lever 12 of a transfer case 14 in a predetermined position. Also shown in FIG. 1 is the gear shift lever 16 for the transmission 18 of the four wheel drive vehicle 20 in which the transfer case 14 is installed. As can be seen by the indicia of the transfer case actuator lever knob 22, the transfer case 14 has four modes which are labeled 4LO, N, 2H, and 4H. 4LO means four wheel drive at a high power gear ratio for low speeds, N means neutral, 2H means two wheel drive low power gear ratio for high speeds and 4H means four wheel drive, low power gear ratio for high speeds. The relative positions of the indicia on the knob 22 indicate the relative position of the lever 12 with respect to the transfer case 14 to obtain that mode of drive out of the transfer case 14.

The lock 10 is comprised of a base plate 24 which is preferably fixedly attached to the floor above the transfer case 14 by self-locking screws 25 or by welding. The base member 24 is shown having a ring shape with upstanding brackets 26 and 28 fixedly attached to the upwardly facing side surface 30 of the ring 24 at opposite ends 32 and 34 thereof in alignment with the direction of movement of the lever 12 as shown by arrow 36. The brackets 26 and 28 provide a firm anchor for pivots 38 and 40 (FIG. 2) which allow rotation of an inverted U-shaped metal strap member 42. The pivots 38 and 40 are shown as loose rivets which pass through the brackets 26 and 28 and the member 42. They are slightly off center so that the brackets can be relatively short and so gravity assists in retaining the strap member in position. The member 42 includes a plurality of gates or U-shaped cutouts 44 and 46 in one of two side surfaces 45a and 45b thereof which when the member is pivoted to the position shown in FIGS. 2, 4 and 5, can surround the transfer case actuator lever 270° to retain the lever 12 in either the N position where the cutaway shape of the lever 12 is shown or an alternate position wherein the lever 12 is shown in dotted outline in FIG. 2. The gate can maintain the lever position because the lever 12 can move only along the path shown by arrow 36 which is parallel to the axis 47 of the pivots 38 and 40 and the gate includes abutment walls 44a and b or 46a and b which are perpendicular thereto. When the member 42 is rotated out of the way to the position shown in FIG. 3, the lever is free to be moved to any of its four positions.

A lock arm 48 is connected by a pivot 49 to the strap member 42 ajacent the gate 44 and 46. The lock arm 48 is shown in FIGS. 1 through 5 as having a U-shaped configuration which when pivoted out of the way as shown in FIGS. 3 and 4, allows the lever 12 to engage the gates 44 or 46 or when rotated to the position shown in FIG. 5, completes the surrounding of the lever 12 by means of an abutment surface 50 so that there is no chance for the lever 12 or the member 42 to move with the arm 48 in the position shown in FIG. 5. Means such as an unclasped padlock 52 can be provided to pass through holes 54 and 56 in the strap member 42 and lock arm 48 respectively which are in alignment when the arm 48 is in its closed position to maintain the transfer case 14 in the desired mode. The padlock 50 is fully clasped when it is desired to lock the transfer case in the neutral position so that the engine of the vehicle 20 cannot be used to move the vehicle, thus making the vehicle more secure from theft.

An alternate embodiment is shown in FIG. 6 with the similar portions thereof numbered the same as those of FIGS. 1 through 5 with a prime (') added thereto. The modification of FIG. 6 involves the lock arm which instead of being pivotally mounted at one end, takes the form of a pin 62 which passes through a plurality of aligned cylinders 64, 66 and 68 to lock the lever 12 in the gate. A tab 71 can be provided at a suitable end location on the pin 62 having hole 72 therethrough. When the pin 62 is fully inserted in the cylinders, the hole 72 can be aligned with a similar hole 76 in the strap member 42'. Once aligned, the holes 72 and 76 can receive and be locked together by means such as padlock 52.

Thus there has been shown and described novel devices for selectively locking and retaining the actuator lever of a transfer case of a four wheel drive vehicle in one of a plurality of predetermined positions to assure the transfer case remains in a given drive mode which fulfill all of the other objects and advantages sought therefor. Many changes, modifications, variations, and other uses and applications of the subject lock will, however, become apparent to those skilled in the art after considering this specification and the accompanying drawing. All such changes, modifications, alterations and other uses and applications which do not depart from the spirit and scope of the invention are deemed to be covered by the invention which is limited only by the claims that follow:

What is claimed is:

1. An actuator lever lock for the transfer case of a four wheel drive vehicle including:
    a base member fixedly mounted relative to the transfer case and positioned about the actuator lever thereof;
    a pair of pivot members connected to said base member in parallel alignment with the direction of shifting motion of the actuator lever; and
    an inverted U-shaped strap member connected for rotation at its ends to said pivot members, said strap member having at least one cutout partially through a side portion thereof in position to engage the lever when it is in a predetermined position to prevent shifting lever movement and a connected lockable closure member adjacent said cutout which in association with said cutout can surround the lever.

2. The lock defined in claim 1 wherein said inverted U-shaped strap member includes a plurality of cutouts, each being positioned to retain the lever in a predetermined shift position.

3. The lock defined in claim 2 wherein said lockable closure member is a U-shaped member pivotally connected to said inverted U-shaped strap member adjacent said cutouts, said lockable closure member and said strap member including means for lock engagement therebetween when said closure member is in position to surround the lever.

4. The lock defined in claim 2 wherein said lockable closure member is a pin, said strap member including a plurality of aligned cylinders adjacent said cutouts for engagement and retention of said pin, said pin and strap member including means for lock engagement therebetween when said closure member is in position to surround the lever.

5. The lock defined in claim 4 wherein said means for lock engagement of said pin include a tab connected to one end thereof defining a lock clasp engaging hole therethrough.

6. The lock defined in claim 1 wherein said defined cutout is formed having facing parallel abutment walls which are perpendicular to the direction of shifting motion of the lever.

7. The lock defined in claim 2 wherein the transfer case lever has four shifting positions including neutral, said strap member having a cutout for retaining the lever in its neutral position.

8. The lock defined in claim 3 wherein said means for lock engagement include a lock clasp passageway through said strap member and a lock clasp passageway through said closure member opposite from said pivot therebetween, said passageways being in alignment when said closure member is in position to surround the lever.

9. The lock defined in claim 6 wherein said pivot members are axially aligned and vertically out of alignment with the lever so said strap member must lift when being disengaged from the lever.

10. The lock defined in claim 9 wherein said pivot members attach to said strap member adjacent a side surface thereof opposite from the side surface thereof in which said cutout is defined.

* * * * *